United States Patent
Weingärtner et al.

(10) Patent No.: US 12,017,710 B2
(45) Date of Patent: Jun. 25, 2024

(54) TRACK DRIVE OF AN AGRICULTURAL PRODUCTION MACHINE

(71) Applicant: CLAAS Industrietechnik GmbH, Paderborn (DE)

(72) Inventors: Felix Weingärtner, Herford (DE); Sebastian Wagemann, Oelde-Sünninghausen (DE); Sascha Rackow, Paderborn (DE)

(73) Assignee: CLAAS Industrietechnik GmbH, Paderborn (DE)

( * ) Notice: Subject to any disclaimer, the term of this patent is extended or adjusted under 35 U.S.C. 154(b) by 703 days.

(21) Appl. No.: 17/174,786

(22) Filed: Feb. 12, 2021

(65) Prior Publication Data

US 2021/0269106 A1   Sep. 2, 2021

(30) Foreign Application Priority Data

Feb. 27, 2020   (DE) .......................... 102020105136.0

(51) Int. Cl.
*B62D 55/084*   (2006.01)
*B62D 55/10*   (2006.01)
(Continued)

(52) U.S. Cl.
CPC ........... *B62D 55/084* (2013.01); *B62D 55/10* (2013.01); *B62D 55/108* (2013.01);
(Continued)

(58) Field of Classification Search
CPC .... B62D 55/084; B62D 55/10; B62D 55/108; B62D 55/1083; B62D 55/1086;
(Continued)

(56) References Cited

U.S. PATENT DOCUMENTS

| 8,911,031 B2 * | 12/2014 | Bessette | B62D 55/084 |
| | | | 305/128 |
| 10,827,681 B2 | 11/2020 | Schwarz | |

(Continued)

FOREIGN PATENT DOCUMENTS

| DE | 20000737 U1 | 4/2000 |
| EP | 2727803 A2 | 5/2014 |
| WO | 2006018215 A1 | 2/2006 |

OTHER PUBLICATIONS

European Search Report issued in related application No. EP20205619.8, dated Apr. 16, 2021 (5 pages).

*Primary Examiner* — Kip T Kotter
(74) *Attorney, Agent, or Firm* — Lempia Summerfield Katz LLC (57) ABSTRACT

A track drive of an agricultural production machine is disclosed. The track drive includes a driving wheel, a front deflection roller, a rear deflection roller, a continuous caterpillar track around the driving wheel and the deflection rollers, and middle rollers between the front and rear deflection roller. The track drive further includes a track frame and a swing frame. Using the swing frame, the track drive pivots about a first axis of the agricultural production machine, and the track frame pivots about a second axis of the swing frame. The second axis is at a distance from the first axis, and a spring system or damper system is positioned between the track frame and the pivot frame. The deflection rollers are positioned on the track frame with the middle rollers positioned on a common support element, which is positioned pivotably about a third axis on the track frame.

20 Claims, 5 Drawing Sheets

(51) Int. Cl.
*B62D 55/108* (2006.01)
*B62D 55/112* (2006.01)
*B62D 55/125* (2006.01)
*B62D 55/14* (2006.01)
*B62D 55/24* (2006.01)

(52) U.S. Cl.
CPC ........... *B62D 55/125* (2013.01); *B62D 55/14* (2013.01); *B62D 55/244* (2013.01); *B62D 55/112* (2013.01)

(58) Field of Classification Search
CPC .... B62D 55/112; B62D 55/125; B62D 55/14; B62D 55/244; B62D 55/305
USPC .......................... 305/131, 132, 133, 134, 135
See application file for complete search history.

(56) References Cited

U.S. PATENT DOCUMENTS

| | | | |
|---|---|---|---|
| 10,897,847 B2 | 1/2021 | Rathjens | |
| 2004/0099451 A1* | 5/2004 | Nagorcka | B62D 55/0842 180/9.5 |
| 2008/0084111 A1* | 4/2008 | Rainer | B62D 55/1125 305/124 |
| 2010/0071969 A1 | 3/2010 | Rainer | |
| 2014/0125118 A1 | 5/2014 | Nagorcka | |
| 2017/0129557 A1* | 5/2017 | Gustafson | B62D 55/104 |
| 2019/0059229 A1 | 2/2019 | Rathjens | |
| 2020/0148290 A1* | 5/2020 | Smith | B62D 55/14 |
| 2020/0269938 A1 | 8/2020 | Silies | |

\* cited by examiner

TRACK DRIVE OF AN AGRICULTURAL PRODUCTION MACHINE

CROSS REFERENCE TO RELATED APPLICATION

This application claims priority under 35 U.S.C. § 119 to German Patent Application No. DE 102020105136.0 filed Feb. 27, 2020, the entire disclosure of which is hereby incorporated by reference herein.

FIELD OF THE INVENTION

The invention relates to a track drive of an agricultural production machine.

BACKGROUND

Agricultural production machines, such as for example tractors or self-propelling harvesters, are increasingly equipped with track drives enabling better transmission of tractive forces to the ground so that the agricultural production machines may move more easily through rough or muddy fields.

Track drives include a large contact area with the ground, such as for example, a caterpillar track that includes an elastic material such as rubber. The track drive includes a track frame (on which are arranged the driving wheel to, for example, drive the caterpillar track by friction), front and rear deflection rollers, and middle rollers located therebetween.

In such a case, the deflection rollers and the middle rollers are positioned in practice using a number of pivotable elements. For example, EP2727803A2 discloses a track drive for an agricultural production machine with a caterpillar track. With such a track drive, the front deflection roller and the front middle roller are suspended on a front rocker assembly that is mounted by a first suspension spring assembly on a yoke plate carrier. The rear deflection roller and the rear middle roller are suspended on a rear rocker assembly that is also mounted by a second suspension spring assembly on the yolk plate carrier.

DESCRIPTION OF THE FIGURES

The present application is further described in the detailed description which follows, in reference to the noted plurality of drawings by way of non-limiting examples of exemplary implementation, in which like reference numerals represent similar parts throughout the several views of the drawings, and wherein.

DETAILED DESCRIPTION

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

As discussed in the background, the track drive may include pivotable elements, which may require a complex design and a number of spring and damper elements in order to achieve comfortable operation of the track drive even when driving over uneven ground. In this regard, a track drive is disclosed which simplifies the design of a track drive such that it enables comfortable operation of the track drive using fewer spring and damper elements.

In one or some embodiments, a track drive of an agricultural production machine is disclosed. The track drive includes a driving wheel, a front deflection roller and a rear deflection roller, a continuous caterpillar track arranged or positioned around the driving wheel and the deflection rollers, and a plurality of middle rollers located or positioned between the front and rear deflection roller. According to one or some embodiments, the track drive has a track frame and a swing frame, wherein by using the swing frame, the track drive is arranged or positioned pivotably about a first axis on the agricultural production machine, and the track frame is arranged or positioned pivotably about a second axis on the swing frame, wherein the second axis is at a distance from the first axis, and at least one spring system and/or damper system is arranged or positioned between the track frame and the pivot frame, wherein the deflection rollers are arranged or positioned on the track frame, wherein the middle rollers are arranged or positioned on a common support element, and wherein the common support element is arranged or positioned on the track frame.

The disclosed track frame includes one or more benefits. For example, the load of the agricultural production machine to be borne may first be directed onto the track frame rotatably mounted opposite the swing frame. In turn, this track frame may be supported using the spring and/or damper system against rotation relative to the swing frame.

All of the rollers of the track frame that support the track frame and therefore the agricultural production machine on the ground may be assigned to the track frame. Accordingly, given the pivotable design of the track frame relative to the swing frame as well as the spring system and/or damper system arranged or positioned directly therebetween, one, some or all the rollers with which the track drive is supported on the ground are spring-loaded or dampened by a spring and/or damper system. Consequently, the design of the track drive may be more economical and require less servicing compared to a more complex system with a plurality of elastic and/or damping elements. In particular, the system may consist of a single spring system or damper system, which may be relegated to a single section or region.

In one or some embodiments, the support element may be pivotably arranged on the track frame about a third axis. A pivotable arrangement of the support element on which the middle rollers are arranged or positioned may provide additional driving comfort. In particular, forces acting on one of the middle rollers may be transmitted by the support element to middle rollers that move relative to the ground in a direction opposite this middle roller, wherein these return the force at least proportionately via the caterpillar track to the ground. In this way, the elasticity of the caterpillar track and the ground may function like dampers.

In one or some embodiments, the front deflection roller and/or the rear deflection roller may be arranged on the track frame by a clamping apparatus to clamp with or to the caterpillar track. This may clamp the caterpillar track between the deflection rollers and the driver wheel.

In one or some embodiments, a plurality of middle rollers, such as two middle rollers, may be arranged or positioned on the support element, wherein one of the middle rollers is arranged or positioned in a region of the support element located in a forward driving direction proceeding from the third axis, and the other middle roller is arranged or positioned on the support element in a region located opposite the forward driving direction proceeding from the third axis.

Given this arrangement, the middle rollers that support the caterpillar track on the ground have an opposite direction of movement relative to the ground. This may be advantageous for the above-described proportionate return of forces that are directed toward one of the two rollers and back to the ground using the other roller.

In one or some embodiments, the track drive may have a plurality of support elements, such as two support elements, each with two middle rollers, wherein the two support elements are fixedly arranged or positioned opposite each other on the track frame and pivotably about the third axis. A particularly large region of the caterpillar track may thereby be supported on the ground using the middle rollers.

In one or some embodiments, the two support elements may be pivotably arranged about the third axis decoupled from each other. Accordingly, the support elements may pivot about the third axis independent of each other to reduce or avoid mechanical stress between the same.

In one or some embodiments, the middle rollers may be arranged in pairs, wherein the respective middle rollers of a pair are arranged on sides of a transverse axis section of the support element extending opposite from each other and in the forward direction, wherein the transverse axis section may be rotated about a longitudinal axis of the support element extending in the forward direction, wherein the support element may be rotatable about the third axis that extends between two pairs of middle rollers. This arrangement enables a pivoting movement of the respective middle rollers of a pair about the longitudinal axis extending in the forward direction, and moreover enables a pivoting movement of the respective pair about the third axis that extends transversely to the longitudinal axis so that an optimum equalization of the contact forces acting on the middle rollers is achieved.

In one or some embodiments, the second axis may be arranged or positioned on the swing frame located in a region opposite the forward driving direction of the agricultural production machine proceeding from the first axis so that an arrangement or positioning of the spring and/or damper system is possible and may be located in a region of the swing frame in the forward driving direction.

In one or some embodiments, the spring system and/or damper system may be arranged or positioned on the swing frame in a region in the forward driving direction of the agricultural production machine proceeding from the first axis. In particular, the track drive may relegate the functionality provided by the spring system and/or the damper system to a single region, such as in the region in the forward driving direction of the agricultural production machine proceeding from the first axis or in the region opposite the forward driving direction of the agricultural production machine proceeding from the first axis. In this way, the track drive may be significantly simplified. To accomplish this, the spring system and/or damper system may be situated or positioned close or proximate to the front deflection roller so that impacts that act on the front deflection roller from any unevenness in the ground may be well absorbed by the spring system and/or damper system.

In one or some embodiments, the driver wheel, the front deflection roller, and the rear deflection roller may be arranged or positioned such that the caterpillar track has a substantially triangular outline. This may be an advantageous shape with respect to the installation space available for the track drive.

In one or some embodiments, the driving wheel may be rotatably mounted about a fourth axis, wherein the fourth axis lies on a vertical axis with the first axis and/or the third axis. This may be advantageous since the load distribution between the respective deflection rollers and the respective middle rollers may be accordingly equalized when the ground is uneven.

Figure 1:
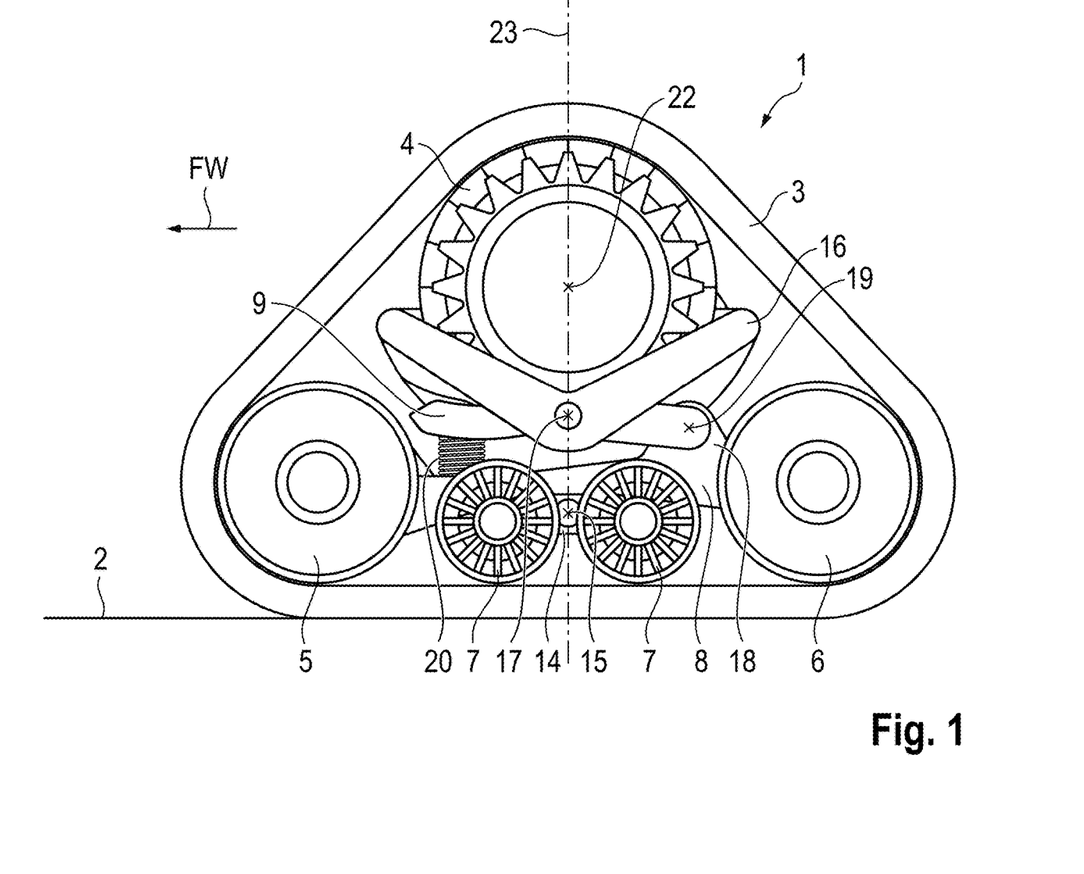
FIG. 1 shows a schematic side view of a track drive.

Referring to the figures, FIG. 1 shows a track drive 1 of an agricultural production machine, such as a tractor or self-propelling harvester (e.g., a combine or a forage harvester), not shown. An example of a combine harvester is disclosed in U.S. Pat. No. 10,827,681, incorporated by reference herein in its entirety. An example of a forage harvester is disclosed in U.S. Pat. No. 10,897,847, incorporated by reference herein in its entirety. The track drive 1 has an elastic caterpillar track 3, for example made of rubber, that may continuously circulate to support the agricultural production machine against the ground 2. The caterpillar track 3 may be driven by a driving wheel 4, made to rotate, and may run over or contact a front deflection roller 5 and a rear deflection roller 6 that deflects the caterpillar track 3 and supports the production machine on the ground 2. Moreover, one or more middle rollers, such as two middle rollers 7, are arranged or positioned between the deflection rollers 5, 6 and may additionally support the production machine on the ground 2.

Figure 2:
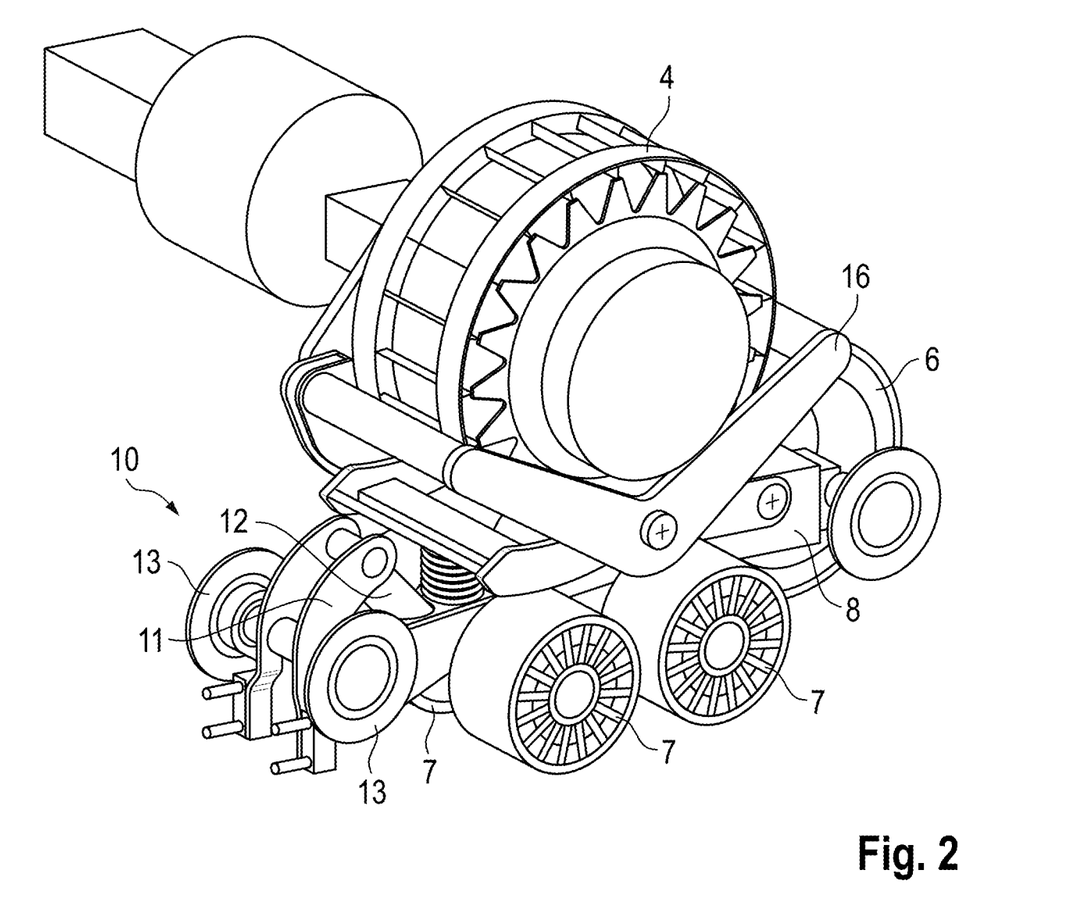
FIG. 2 shows a schematic section of the track drive with a visible clamping apparatus.

Furthermore, the track drive 1 comprises a track frame 8 and a swing frame 9. The normal forward driving direction is indicated by FW in FIG. 1. The track frame 8 may substantially extend in the forward driving direction FW of the track drive 1. The front deflection roller 5 is arranged or positioned on the front end of the track frame 8 using a tensioning device 10 illustrated in FIG. 2. In one or some embodiments, the tensioning device 10 has a track clamping lever 11. The track clamping lever 11 may be pivotably arranged or positioned on the track frame 8. Between the track frame 8 and the track clamping lever 11, an actuator 12 is arranged or positioned that may, for example, be designed as a hydraulic cylinder unit for swinging the track clamping lever 11. Moreover, the front deflection roller 5 may be rotatably mounted on the track clamping lever 11 such that it is pressed against the caterpillar track 3 by using the actuator 12, and a clamping force may be applied to the caterpillar track 3. In the embodiment of the invention depicted in FIG. 2, two front deflection rollers 5 are arranged coaxially on the track clamping lever 11, wherein only the wheel hubs 13 for attaching the front deflection rollers 5 are shown in FIG. 2.

In one or some embodiments, the rear deflection roller 6 is fixedly attached and rotatably mounted on the rear end of the track frame 8. In an alternative embodiment, the rear deflection roller 6 are arranged or positioned on the rear end of the track frame 8 using a clamping device 10, wherein the front deflection roller 5 may be fixedly arranged or positioned on the front end of the track frame 8 or, as described above, on the front end of the track frame 8 also using a clamping device 10. The embodiment shown in FIG. 2 also includes two rear deflection rollers 6 that are arranged or positioned coaxially on the rear end of the track frame 8.

As shown in FIG. 1, a support element 14 is fixedly mounted between the rear and the front deflection roller 5, 6 and is pivotably mounted about a third axis 15 on the track frame 8. In one or some embodiments, the support element 14 is designed to be rotationally symmetrical with the third axis 15. Two middle rollers 7 may be fixedly and rotatably mounted on the support element 14 that support the production machine on the ground 2. In this case, one of the middle rollers 7 is in a region of the support element 14 located in the forward driving direction FW proceeding from the third axis 15, and the other middle roller 7 assigned to the support element 14 is arranged on the support element 14 in a region opposite the forward driving direction FW proceeding from the third axis 15. Given this arrangement, the middle rollers 7 that support the caterpillar track 3 on the ground 2 have an opposite direction of movement relative to the ground 2. This means that the other middle roller 7 of the support element 14 may execute a downward movement in the event of an upward movement of one of the middle rollers 7.

In one or some embodiments, the track drive 1 has two support elements 14 that are fixedly and movably mounted about the third axis 15 opposite each other on the track frame 8, and each holds two rotatably mounted middle rollers 7. In this case, the two support elements 14 may be pivotably mounted about the third axis 15 decoupled from each other.

Figure 4:
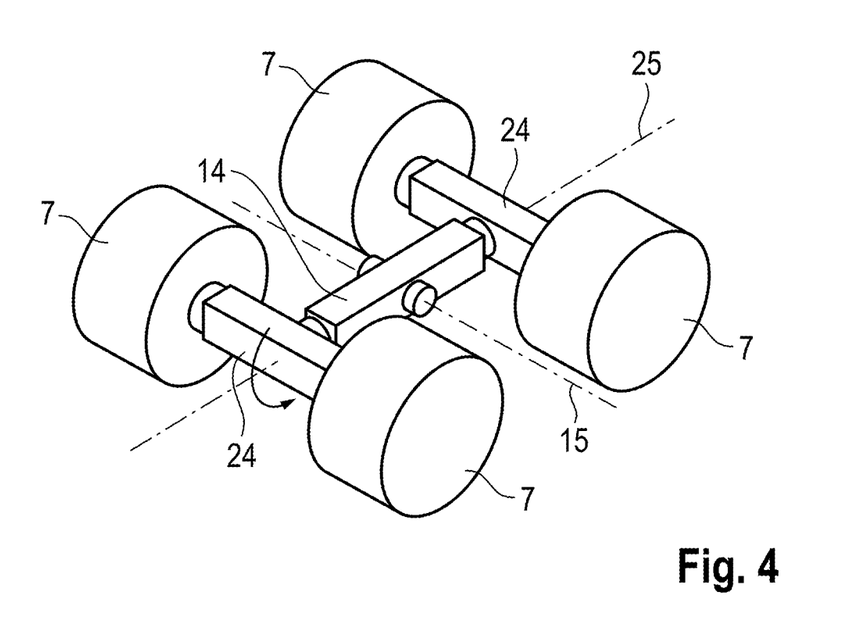
FIG. 4 shows an alternative embodiment in which all of the middle rollers are assigned to a support element.

In an alternative embodiment shown in FIG. 4, all of the middle rollers 7 are assigned to a support element 14. The support element 14 may be pivotably arranged about the third axis 15 on the track frame 8. In this alternative embodiment, the support element 14 has transverse axial sections 24 on its outer ends that are rotatably mounted on the support element 14 about a longitudinal axis 25 of the support element 14 extending in the forward driving direction FW. The middle rollers 7 are assigned in pairs to one of the transverse axial sections 24. In this case, the middle rollers 7 of a pair are arranged on opposite sides of the transverse axial section 24 and extending in the forward direction FW. The third axis 15 extends in this case between the pairs.

Moreover, FIG. 1 shows a support frame 16 that is arranged or positioned such that it is stationary on the agricultural production machine. On the support frame 16, the track drive 1 is pivotably arranged using the swing frame 9 about a first axis 17 on the production machine. The swing frame 9 may extend substantially between the front deflection roller 5 and the rear deflection roller 6.

Figure 5:
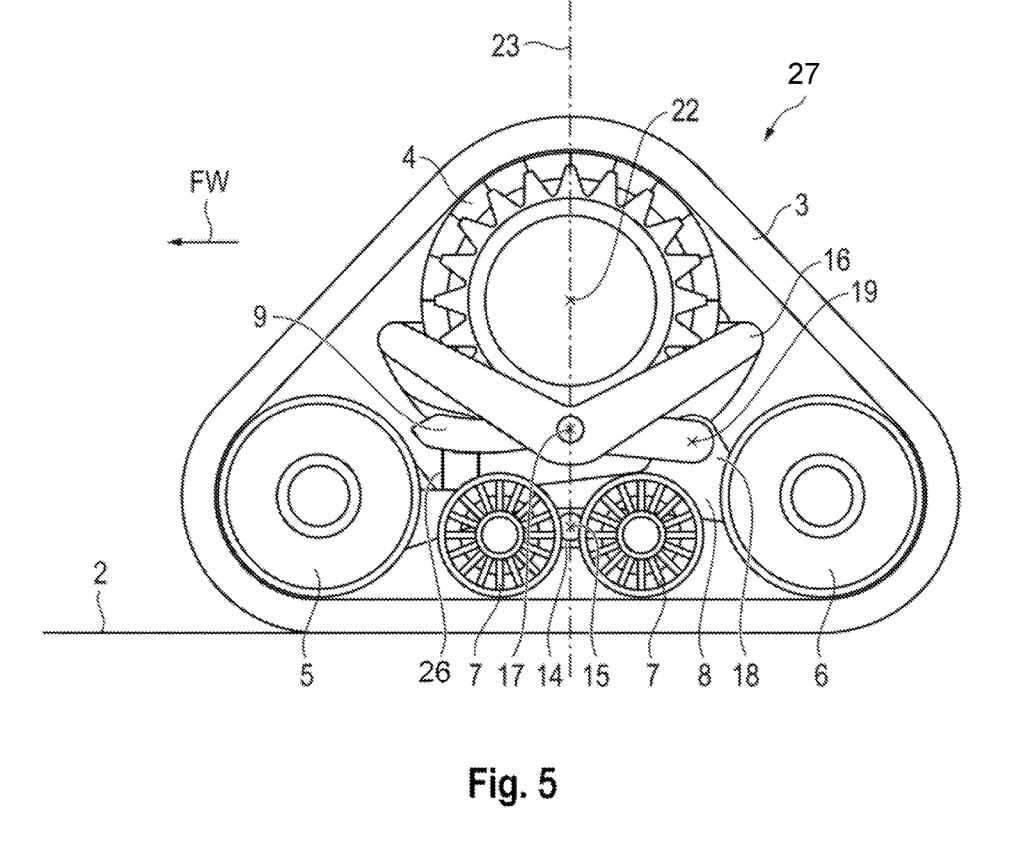
FIG. 5 shows a schematic side view of a track drive as illustrated in FIG. 1 with a damper system instead of a spring system.

In one or some embodiments, the track frame 8 has a projection 18 at the top in a region facing the rear deflection roller 6. At this projection 18, the track frame 8 is fixedly and pivotably mounted about a second axis 19 on the swing frame 9, wherein the second axis 19 is at a distance from the first axis 17. Proceeding from the first axis 17, the second axis 19 is in a region located opposite the forward driving direction FW of the track drive 1. Proceeding from the first axis 17, a spring system 20 that is designed as a spring in one or some embodiments is arranged or positioned between the track frame 8 and the swing frame 9 in a region located in the forward driving direction FW. This arrangement makes it possible for the track frame 8 to execute a pivoting movement about the second axis 19, wherein the spring system 20 spring-loads the pivoting movement of the track frame 8 about the second axis 19 relative to the swing frame 9. In addition or alternatively to the spring system 20, it is contemplated to arrange or position a damper system, for example in the form of a piston cylinder unit, between the track frame 8 and the swing frame 9 that is also positioned in a region opposite the forward driving direction FW of the track drive 1 proceeding from the first axis 17 and that dampens the pivoting movement of the track frame 8 about the second axis 19 relative to the swing frame 9. In an alternative embodiment, an arrangement is also contemplated for the second axis 19 in a region located in the forward driving direction FW proceeding from the first axis 17, wherein the spring system 20 and/or damper system is to be arranged or positioned in a region located opposite the forward driving direction FW proceeding from the first axis of 17. FIG. 5 illustrates one placement of example of placement of damper system 26 of track drive 27.

Figure 3:
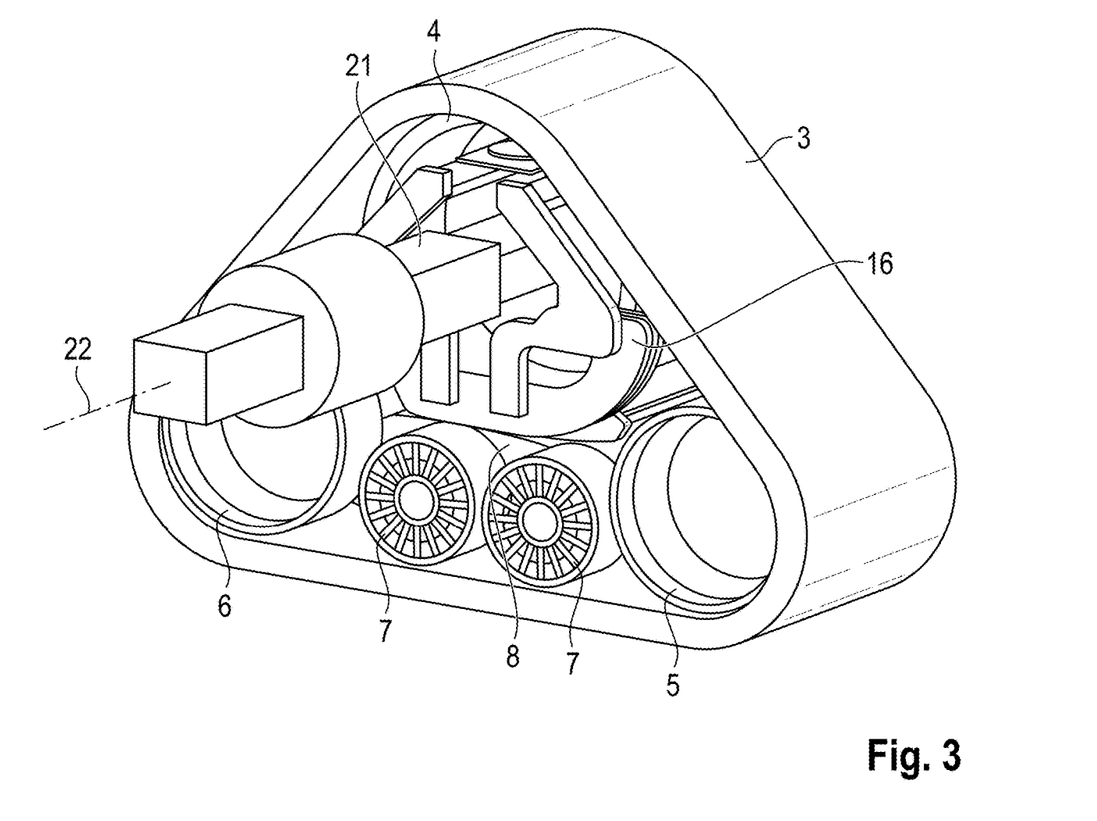
FIG. 3 shows a rear view of the track drive with a drive axle for driving the driving wheel.

FIG. 3 shows a drive axle 21 of the agricultural production machine. The driving wheel 4 is driven using the drive axle 21, wherein the driving wheel 4 in turn drives the caterpillar track 3. To accomplish this, the driving wheel 4 is rotatably arranged or positioned about a fourth axis 22 on the agricultural production machine separate from the support frame 16 and the swing frame 9 assigned thereto as well as the track frame 8 on the drive axle 21. The separate arrangement may be advantageous since excitations, for example in the form of impacts that act on the deflection rollers 5, 6 and middle rollers 7 due to an uneven ground 2, may not be transmitted to the driving wheel 4. For this reason, no additional elastic and damping elements are needed for the arrangement of the driving wheel 4. The driving wheel 4 lies between the rear deflection roller 6 and the front deflection roller 5 and is arranged rotatably with the fourth axis 22 thereabove. Consequently, the track drive has the shape of triangle, such as an equilateral triangle or substantially an equilateral triangle, that may be advantageous for the arrangement of the track drive 1 on an agricultural production machine, such as a tractor or self-propelling harvester (see US Patent Application Publication No. 2020/0269938 A1 as an example of a different track drive incorporated in a harvester, incorporated by reference herein in its entirety). Moreover, in a resting state, the fourth axis 22 lies on a vertical axis 23 with the first axis 17 and the third axis 15, for example when the track drive 1 is on flat and horizontally extending ground 2.

Further, it is intended that the foregoing detailed description be understood as an illustration of selected forms that the invention can take and not as a definition of the invention. It is only the following claims, including all equivalents, that are intended to define the scope of the claimed invention. Further, it should be noted that any aspect of any of the preferred embodiments described herein may be used alone or in combination with one another.

REFERENCE NUMBER LIST

1 Track drive
2 Ground
3 Caterpillar track
4 Driving wheel
5 Front deflection roller
6 Rear deflection roller
7 Middle roller
8 Track frame
9 Swing frame
10 Clamping apparatus
11 Track clamping lever
12 Actuator
13 Wheel hub 14 Support element
15 Third axis
16 Support frame
17 First axis
18 Projection
19 Second axis
20 Spring system
21 Drive axle
22 Fourth axis
23 Vertical axis
24 Transverse axis sections
25 Longitudinal axis
26 Damper system
FW Forward driving direction

The invention claimed is:

1. A track drive of an agricultural production machine comprising:
   a driving wheel;
   a front deflection roller;
   a rear deflection roller;
   a continuous caterpillar track positioned around the driving wheel, the front deflection roller, and the rear deflection roller;
   a plurality of middle rollers positioned between the front deflection roller and the rear deflection roller;
   a track frame;
   a swing frame;
   at least one of a spring system or a damper system; and
   at least one common support element;
   wherein the track drive, using the swing frame, is configured to pivot about a first axis on the agricultural production machine;
   wherein the track frame is configured to pivot about a second axis on the swing frame;
   wherein the second axis is positioned at a distance from the first axis;
   wherein the first axis is closer to a geometric center as defined by the track than the second axis;
   wherein the at least one of the spring system or the damper system is positioned between the track frame and the swing frame;
   wherein the front deflection roller and the rear deflection roller are positioned on the track frame;
   wherein the plurality of middle rollers are positioned on the at least one common support element; and
   wherein the at least one common support element is positioned on the track frame.

2. The track drive of claim 1, wherein the at least one common support element is pivotably positioned on the track frame about a third axis of the track frame.

3. The track drive of claim 2, further comprising a clamping apparatus; and
   wherein at least one of the front deflection roller or the rear deflection roller is positioned on the track frame using the clamping apparatus to clamp to the caterpillar track.

4. The track drive of claim 3, wherein one of the front deflection roller or the rear deflection roller is positioned on the track frame using the clamping apparatus to clamp to the caterpillar track and another of the front deflection roller or the rear deflection roller is fixedly attached to a portion of the continuous caterpillar track.

5. The track drive of claim 3, wherein both of the front deflection roller or the rear deflection roller are positioned on the track frame using the clamping apparatus to clamp to the caterpillar track.

6. The track drive of claim 3, wherein the plurality of middle rollers are positioned on the at least one common support element;
   wherein one of the plurality of middle rollers is positioned in a region of the at least one common support element located in a forward driving direction of the agricultural production machine proceeding from the third axis; and
   another of the plurality of middle rollers is positioned on the at least one common support element in a region located opposite the forward driving direction proceeding from the third axis.

7. The track drive of claim 2, wherein the at least one common support element comprises two support elements, each of the two support elements with two middle rollers;
   wherein the two support elements are fixedly positioned opposite each other on the track frame and pivotably about the third axis; and
   wherein the two support elements are pivotably positioned about the third axis decoupled from each other.

8. The track drive of claim 2, wherein the plurality of middle rollers are positioned in pairs;
   wherein respective middle rollers of a pair are positioned on sides of a transverse axis section of the at least one common support element extending opposite from each other and in a forward driving direction of the agricultural production machine;
   wherein the transverse axis section is configured to rotate about a longitudinal axis of the at least one common support element extending in the forward driving direction; and
   wherein the at least one common support element is configured to rotate about the third axis that extends between two pairs of the plurality of middle rollers.

9. The track drive of claim 2, wherein the driving wheel is rotatably mounted about a fourth axis; and
   wherein the fourth axis lies on a vertical axis with at least one of the first axis or the third axis.

10. The track drive of claim 2, wherein the driving wheel is rotatably mounted about a fourth axis; and
    wherein the fourth axis lies on a vertical axis with both of the first axis and the third axis.

11. The track drive of claim 2, wherein each of the plurality of middle rollers are assigned to the at least one common support element;
    wherein the at least one common support element is pivotably arranged about the third axis on the track frame;
    wherein the at least one common support element has a plurality of transverse axial sections on its ends; and
    wherein the plurality of middle rollers are assigned in pairs to a respective one of the plurality of transverse axial sections such that the middle rollers of a respective pair are arranged on opposite sides of the respective one of the plurality of transverse axial sections.

12. The track drive of claim 1, wherein the second axis is positioned on the swing frame in a region opposite a forward driving direction of the agricultural production machine proceeding from the first axis.

13. The track drive of claim 1, wherein the driving wheel, the front deflection roller and the rear deflection roller are positioned such that the caterpillar track that encircles the driving wheel, the front deflection roller and the rear deflection roller has a substantially triangular outline.

14. The track drive of claim 13, wherein the at least one common support element is pivotably positioned on the track frame about a third axis of the track frame;

wherein the track drive has a shape of an equilateral triangle;

wherein one of the middle rollers is positioned in a region of the at least one common support element located in a forward driving direction of the agricultural production machine proceeding from the third axis;

wherein another of the middle rollers is positioned in a region of the at least one common support element located opposite the forward driving direction proceeding from the third axis; and wherein the one of the middle rollers and the another of the middle rollers have an opposite direction of movement relative to ground such that the another of the middle rollers executes a downward movement in an event of an upward movement of the one of the middle rollers.

15. The track drive of claim 1, wherein the swing frame extends between the front deflection roller and the rear deflection roller.

16. The track drive of claim 1, wherein the track frame has a projection in a region facing the rear deflection roller; and
    wherein the track frame is fixedly and pivotably mounted at the projection about the second axis on the swing frame.

17. The track drive of claim 1, wherein the at least one of the spring system or the damper system comprises the spring system;
    wherein the spring system is positioned between the track frame and the swing frame in a region located in a forward driving direction of the agricultural production machine; and
    wherein using the spring system, the track frame is configured to execute a pivoting movement about the second axis by the spring system spring-loading the pivoting movement of the track frame about the second axis relative to the swing frame.

18. The track drive of claim 1, wherein the at least one common support element is rotationally symmetrical with a third axis.

19. A track drive of an agricultural production machine comprising:
    a driving wheel;
    a front deflection roller;
    a rear deflection roller;
    a continuous caterpillar track positioned around the driving wheel, the front deflection roller, and the rear deflection roller;
    a plurality of middle rollers positioned between the front deflection roller and the rear deflection roller;
    a track frame;
    a swing frame;
    at least one of a spring system or a damper system; and
    at least one common support element;
    wherein the track drive, using the swing frame, is configured to pivot about a first axis on the agricultural production machine;
    wherein the track frame is configured to pivot about a second axis on the swing frame;
    wherein the second axis is positioned at a distance from the first axis;
    wherein the at least one of the spring system or the damper system is positioned between the track frame and the swing frame;
    wherein the front deflection roller and the rear deflection roller are positioned on the track frame;
    wherein the plurality of middle rollers are positioned on the at least one common support element;
    wherein the at least one common support element is positioned on the track frame; and
    wherein the at least one of the spring system or the damper system is positioned on the swing frame in a region located in a forward driving direction of the agricultural production machine proceeding from the first axis.

20. A track drive of an agricultural production machine comprising:
    a driving wheel;
    a front deflection roller;
    a rear deflection roller;
    a continuous caterpillar track positioned around the driving wheel, the front deflection roller, and the rear deflection roller;
    a plurality of middle rollers positioned between the front deflection roller and the rear deflection roller;
    a track frame;
    a swing frame;
    at least one of a spring system or a damper system; and
    at least one common support element;
    wherein the track drive, using the swing frame, is configured to pivot about a first axis on the agricultural production machine;
    wherein the track frame is configured to pivot about a second axis on the swing frame;
    wherein the second axis is positioned at a distance from the first axis;
    wherein the at least one of the spring system or the damper system is positioned between the track frame and the swing frame;
    wherein the at least one of the spring system or the damper system is directly connected to the track frame and the swing frame;
    wherein the front deflection roller and the rear deflection roller are positioned on the track frame;
    wherein the plurality of middle rollers are positioned on the at least one common support element; and
    wherein the at least one common support element is positioned on the track frame.

* * * * *